United States Patent [19]
Cheng et al.

[11] Patent Number: 5,744,262
[45] Date of Patent: Apr. 28, 1998

[54] STABLE HIGH-VOLTAGE ELECTROLYTE FOR LITHIUM SECONDARY BATTERY

[75] Inventors: Cheng-Hung Cheng, Taipei; Ching-Yih Yao, Miaoli Hsien; Chia-Yu Yang, Hsinchu; Sheng-Hua Shih, Chang-Hua; Tung-Han Kao, Hsinchu; Jin-Ming Chen, Taichung; Weir-Mirn Hurng, Hsinchu, all of Taiwan

[73] Assignee: Industrial Technology Research Institute, Hsinchu, Taiwan

[21] Appl. No.: 717,875

[22] Filed: Sep. 23, 1996

Related U.S. Application Data

[63] Continuation-in-part of Ser. No. 476,516, Jun. 7, 1995, abandoned.
[51] Int. Cl.$^6$ .................................................. H01M 6/16
[52] U.S. Cl. ........................... 429/197; 429/194; 429/224; 429/218; 252/62.2
[58] Field of Search ........................... 429/197, 194, 429/224, 218; 252/62.2

[56] References Cited

U.S. PATENT DOCUMENTS

| | | | |
|---|---|---|---|
| 4,056,663 | 11/1977 | Schlaikjer | 429/197 |
| 4,770,960 | 9/1988 | Nagaura et al. | 429/194 |
| 4,828,834 | 5/1989 | Nagaura et al. | 429/194 |
| 5,340,670 | 8/1994 | Takami et al. | 429/197 |

*Primary Examiner*—Alan Diamond
*Attorney, Agent, or Firm*—W. Wayne Liauh

[57] ABSTRACT

An organic electrolyte for use in a lithium secondary battery comprising a lithium salt dissolved in an organic solvent mixture is disclosed. The lithium salt can be $LiClO_4$, $LiPF_6$, $LiBF_4$, $LiCF_3SO_3$, $LiAsF_6$, or other lithium salt, and the organic solvent mixture contains a carbonate and an acetate. The carbonate is ethylene carbonate, and the acetate can be either methyl acetate or ethyl acetate. The carbonate and the acetate are provided in a ratio of carbonate/acetate ranging from 80/20 to 20/80, or preferably from 40/60 to 60/40, and said lithium salt has a concentration of between 0.6 and 1.5M, or preferably at about 1M. The electrolyte exhibits excellent stability in a lithium secondary battery having a cathode which contains either $LiCoO_2$ or $LiMn_2O_4$, and can withstand charge/discharge voltages of at least as high as 5 V (vs. Li/Li$^+$), with excellent service life.

11 Claims, 10 Drawing Sheets

STABLE HIGH-VOLTAGE ELECTROLYTE FOR LITHIUM SECONDARY BATTERY

FIELD OF THE INVENTION

The present invention is a continuation-in-part application of application Ser. No. 08/476,516 filed Jun. 7, 1995, now abandoned; it relates to a stable high-voltage electrolyte for use in lithium secondary (rechargeable) batteries. More specifically, the present invention relates to electrolyte compositions for use in lithium secondary batteries that exhibit excellent stability during the high-voltage charge/discharge operations so as to enhance the cycle life of the rechargeable battery.

BACKGROUND OF THE INVENTION

Lithium secondary (rechargeable) batteries exhibit several advantages including safety, high energy density, high voltage, long service life, and stable discharge voltage. With the recent rapid progress in the development and proliferation of portable and/or cordless electronic equipment, such as notebook PCS, camcorders, etc., lithium secondary batteries have attracted great attention for use as the power source for driving these electronic equipment. Most notably, the main attention has been focused on C/LiCoO$_2$, and C/LiMn$_2$O$_4$ types of lithium battery cells.

Because of the relatively high discharge voltage and especially the high charge (i.e., recharge) voltage of lithium secondary batteries—typically in the range between 3.6 V and 3.8 V during discharge and 4.2 V or higher during recharge—it is important that appropriate electrolytes be developed which can withstand these high charge/discharge voltages and thus prolong the life of the battery.

In U.S. Pat. No. 5,192,629, it is disclosed an electrolyte for use with a secondary battery comprising a Li$_{1+x}$Mn$_2$O$_4$ intercalation positive electrode (i.e., cathode). The electrolyte comprises a 0.5M to 2M solution of LiPF$_6$ or LiBF$_4$ dissolved in a mixture of non-aqueous dimethylcarbonate (DMC) and ethylene carbonate (EC) solvents wherein the solvents are present in a weight percent ratio ranging from 95 DMC:5 EC to 20 DMC:80 EC. The electrolyte was found to be resistant to oxidation which could occur during the high voltage charging of the secondary battery. The '629 patent utilized LiMn$_2$O$_4$ as the positive electrode. However, no stability data was provided with respect to LiCoO$_2$ type electrode. At room temperature, the breakdown voltage of the electrolyte of '629 was reported to be above 5 V.

In U.S. Pat. No. 5,256,504, it is disclosed a nonaqueous electrolyte secondary battery provided with an anode comprising a carbon material capable of doping and undoping lithium, a nonaqueous electrolyte and a cathode comprising a lithium-containing oxide. In the '504 patent, which provides improved high-temperature storage stability and low-temperature discharge capacity characteristic, the solvent for the nonaqueous electrolyte comprises an aliphatic carboxylate represented by the formula RCOOR' wherein R represents an ethyl group and R' represents an alkyl group having 1–3 carbon atoms, a cyclic carbonate and a chain carbonate. The disclosure provides that the aliphatic carboxylate is one of methyl propionate and ethyl propionate, the cyclic carbonate is ethylene carbonate, and the chain carbonate is diethyl carbonate. The proportions among the aliphatic carboxylate, cyclic carbonate and chain carbonate, by volume, are 10–70%, 20–50%, and 10–70%, respectively.

In U.S. Pat. No. 5,284,722, (Sugeno) it disclosed a non-aqueous electrolyte for high temperature applications. The electrolyte taught in Sugeno was dissolved in a solvent mixture of propylene carbonate with an ester compound represented by the formula of R$_1$COOR$_2$, wherein R$_1$ and R$_2$ can be from C1 to C4.

Japanese Laid-Open Patent publication JP 62-219477 disclose, an electrolyte composition comprising propylene carbonate (PC), butyrolactone, methyl acetate (MA), methyl formate (MF), and dimethyl sulphoxide as the organic solvent for improving the charging/discharging efficiency of the lithium secondary battery. In Japanese Laid-Open Patent publications JP 04-345,769 and JP 04-345,770, it is disclosed a method to increase the electrolysis voltage of an electrolyte by adding carbon ions and propylene so as to reduce the risk of explosion during recharging. Japanese Laid-Open Patent publications JP 05-182,689 and JP 05-290,881 disclose the use of MA and RCOOR' types organic solvents to improve the low-temperature discharge capacity characteristics of the lithium secondary battery.

In all the prior references discussed above, only the '629 patent discussed the stability of the electrolyte. However, the electrolyte disclosed in the '629 patent was developed for secondary batteries using LiMn$_2$O$_4$ as the positive electrode. It is therefore desirable to develop improved electrolyte compositions that can better withstand the high-voltage during the charge/discharge operations of lithium secondary batteries and thus provide a more stable operation and longer cycle life therefor.

SUMMARY OF THE INVENTION

The primary object of the present invention is to develop an electrolyte composition for use in a lithium secondary battery that provides extended cycle life and exhibits enhanced stability during the high-voltage charge/discharge operations. More specifically, the primary object of the present invention is to develop an improved electrolyte composition for use in a lithium secondary battery which can withstand the high working discharge voltage of about 3.6–3.8 V, and the high charge voltage of up to 4.9 V or higher, and will not decompose or be oxidized when subject to such high-voltage conditions.

As a consequence, the present invention discloses an electrolyte composition for use in a lithium secondary battery which exhibits excellent electrolytic and oxidative stability when subject to a voltage of 5 V or higher. The electrolyte composition disclosed in the present invention comprises a lithium ion, which is provided from a lithium salt such as LiClO$_4$, LiPF$_6$, LiBF$_4$, LiCF$_3$SO$_3$, LiAsF$_4$, etc, dissolved in an organic solvent consisting essentially of ethylene/propylene carbonate (EC/PC) and methyl/ethyl acetate (MA/EA). The ratio between the carbonate and the acetate is preferably between 20/80 and 80/20, or more preferably between 40/60 and 60/40, and the concentration of the lithium salt is preferably between 0.6M and 1.5M, or more preferably at about 1M. The (positive) electrode can be LiCoO$_2$ or LiMn$_2$O$_4$.

BRIEF DESCRIPTION OF THE DRAWING

The present invention will be described in detail with reference to the drawing showing the preferred embodiment of the present invention, wherein.

DETAILED DESCRIPTION OF THE PREFERRED EMBODIMENT

The present invention discloses a family of electrolyte compositions for use in a lithium secondary battery with excellent electrolytic and oxidative stability. The electrolyte composition disclosed in the present invention comprises a lithium ion, which is provided from a lithium salt such as LiClO$_4$, LiPF$_6$, LiBF$_4$, LiCF$_3$SO$_3$, LiAsF$_6$, etc, dissolved in an organic solvent consisting essentially of a carbonate, which can be either ethylene carbonate (EC) or propylene carbonate (PC), and an acetate, which can be either methyl acetate (MA) or ethyl acetate (EA). The ratio between the carbonate and the acetate can range between 10/90 and 100/0, preferably between 20/80 and 80/20, and more preferably between 40/60 and 60/40, and the concentration of the lithium salt is preferably between 0.6M and 1.5M, more preferably at about 1M. The electrolyte composition disclosed in the present invention, which can withstand charge/discharge voltages of up to 5 V or higher, can be advantageously utilized in lithium secondary batteries that utilize LiCoO$_2$ or LiMn$_2$O$_4$ as the positive electrode.

The present invention will now be described more specifically with reference to the following examples. It is to be noted that the following descriptions of examples, including the preferred embodiment of this invention, are presented herein for purposes of illustration and description, and are not intended to be exhaustive or to limit the invention to the precise form disclosed.

EXAMPLE 1

Figure 2:
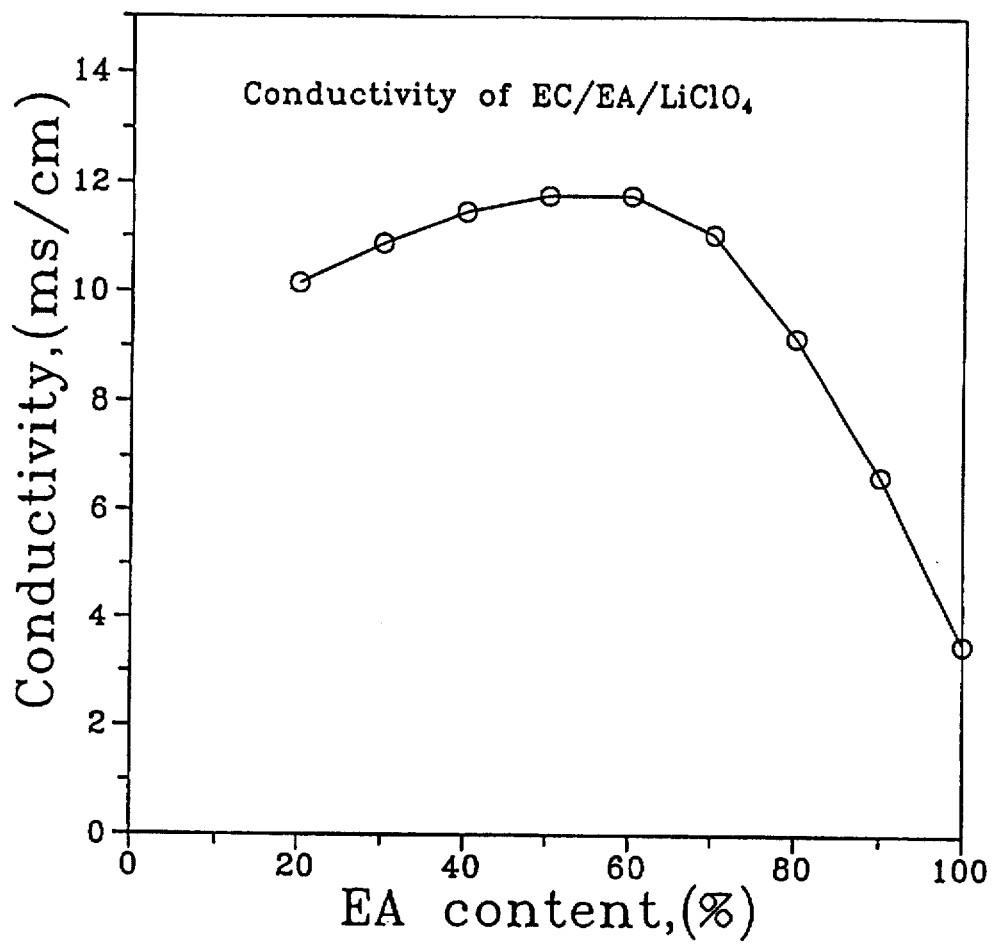
FIG. 2 is a plot of conductivity vs. EA content in an EC/EA/LiClO$_4$ electrolyte composition disclosed in the present invention.

Organic solutions containing ethylene carbonate (EC) and ethyl acetate (EA) at volume ratios ranging from 0/100 to 100/0 were prepared. Lithium salt LiClO$_4$ was added to the organic solutions, respectively, to prepare a series of 1M LiClO$_4$ organic electrolyte solutions. These organic electrolyte solutions were all prepared in a glove box with its humidity controlled below 2 ppm. The electrolyte solutions were respectively placed in a 50-ml beaker, which was placed on top of a hot plate. The conductivities of the organic electrolytes were measured using a WTW Microprocessor Conductivity Meter LF 196, with a TetraCon 96 dry electrode as the probe electrode. The conductivity meter also provided a thermal couple so as to allow conductivity and temperature to be measured simultaneously. The electrolyte solution was stirred and its temperature was controlled during the conductivity measurements. The entire operation was conducted inside the glove box to prevent water invasion. FIG. 2 is a plot of the measured conductivity vs. the EA content in the various EC/EA/LiClO$_4$ electrolytes prepared above. The test results show that maximum conductivity occurred at ratios of EC/EA between 50/50 and 40/60. Below or above this range, the conductivity decreased. All the tests (including those tests in the subsequent Examples) were conducted at room temperature (about 25° C., with air-conditioning).

EXAMPLE 2

Figure 3:
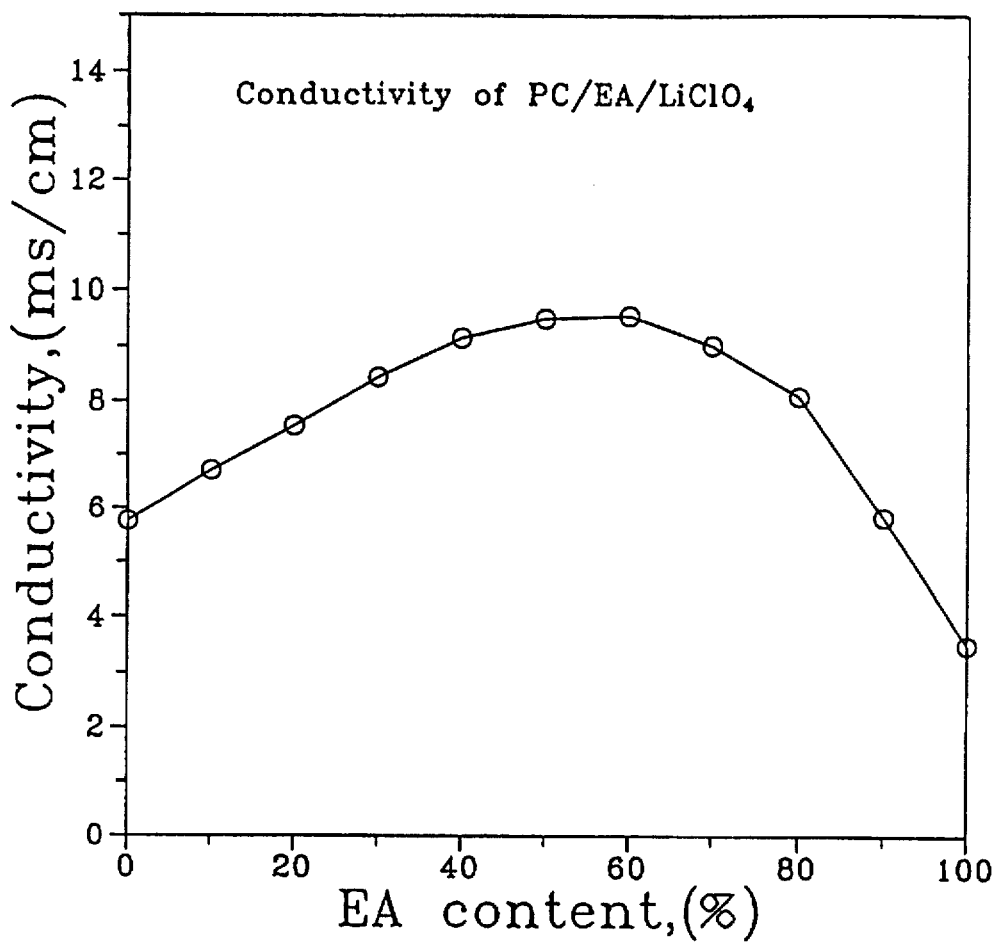
FIG. 3 is a plot of conductivity vs. EA content in a PC/EA/LiClO$_4$ electrolyte composition disclosed in the present invention.

The test procedures in Example 2 were identical to those in Example 1, except that organic solutions containing propylene carbonate (PC) and ethyl acetate (EA) at volume ratios ranging from 0/100 to 100/0 were prepared and tested. Lithium salt LiClO$_4$ was added to the organic solutions, respectively, to prepare a series of 1M LiClO$_4$ organic electrolyte solutions. These organic electrolyte solutions were all also prepared in a glove box with its humidity controlled below 2 ppm. The conductivities of the organic electrolytes were measured using the same WTW Microprocessor Conductivity Meter LF 196, with a TetraCon 96 dry electrode as the probe electrode. The entire conductivity measurement was also conducted inside the glove box. FIG. 3 is a plot of the measured conductivity vs. the EA content in the various PC/EA/LiClO$_4$ electrolytes prepared above. The test results show that maximum conductivity also occurred at ratios of PC/EA between 50/50 and 40/60. Below or above this range, the conductivity decreased, as shown in Example 2.

EXAMPLE 3

An organic electrolyte was prepared by dissolving 1M of LiClO$_4$ into an organic solvent containing 50/50 by volume of ethylene carbonate (EC) and ethyl acetate (EA). This electrolyte, which was prepared in a glove box at a humidity of less than 2 ppm, was designated as EC/EA/LiClO$_4$/1/1/1M. About 0.8 cc. of the electrolyte was added into a Teflon vessel. The Teflon vessel contained a 1 cm$^2$ LiCoO$_2$ plate as the working electrode (i.e., the cathode), and the lithium metal plate, which was used as the counter electrode, was also used as the negative electrode (i.e., anode). The reference electrode was lithium metal.

Figure 4:
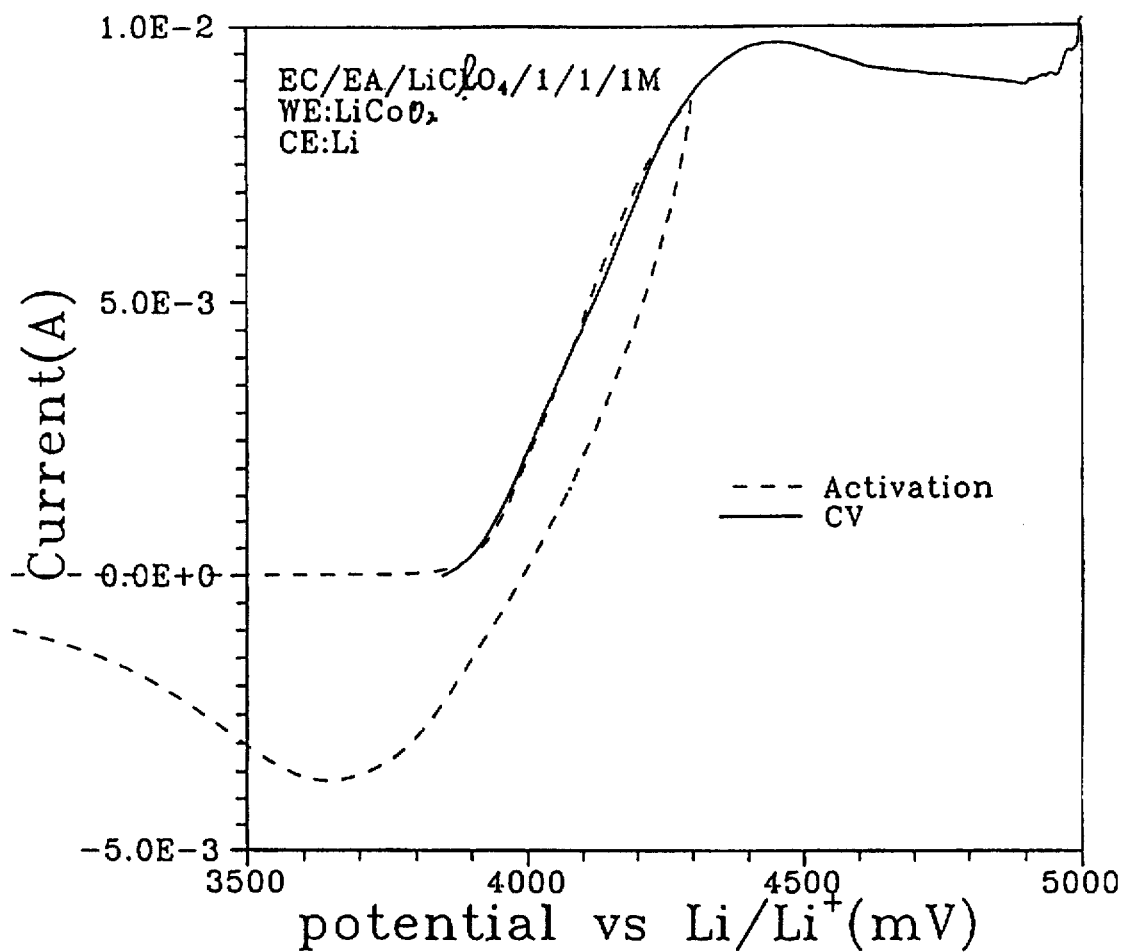
FIG. 4 is a plot of electric current as a function of potential (vs. Li/Li$^+$) measured from an electrolyte according to a first preferred embodiment of the present invention; the composition of the electrolyte is designated as EC/EA/LiClO$_4$/1/1/1M, working electrode: LiCoO$_2$, counter electrode: Li.

Tests were conducted on the electrolyte composition prepared above to determine its stability, i.e., its ability to withstand decomposition under recharging voltages in excess of 4.8 V. Electric current was measured by applying a continuous scan of fixed voltages across the electrolyte, using a power supply, Solarton 1286, at a voltage scanning rate of 1 mV/sec. The test results are shown in FIG. 4. The dashed line (activation) in FIG. 4 was the scanning curve to a voltage of 4.3 V under an open voltage and at a scanning rate of 1 mV/sec. The dashed line in FIG. 4 clearly shows the deintercalation and intercalation of lithium ions at the $LiCoO_2$ electrode. The solid line (closed voltage) in FIG. 4 was a scanning curve to a voltage of 5 V, also at a scanning rate of 1 mV/sec. The solid line in FIG. 4 shows that, during the deintercalation of lithium ions from the $LiCoO_2$ electrode, maximum current occurred at the voltage around 4.5 V. Above 4.5 V, the current was found to decrease slightly with voltage. However, a rapid increase in the current was observed at voltages above 4.9 V. This indicates decomposition of the electrolyte. Thus, from FIG. 4, it can be derived that the stability of the $EC/EA/LiClO_4/1/1/1M$ electrolyte is about 4.9 V. In FIG. 4 (and in subsequent figures), the curve "Activation" was to test whether any short circuit was present in the testing assembly. "Activation" curve was obtained by raising the voltage from 0 V to 4.5 V, then lowered to 2.5 V, finally to 0° C. to observe intercalation and de-intercalation at the electrodes. If no such reaction was observed at the electrode, then the test vessel may not be properly assembled. The curve "CV" represented the actual test of the stability of the electrolyte, by raising the test voltage to 5 V.

EXAMPLE 4

Figure 5:
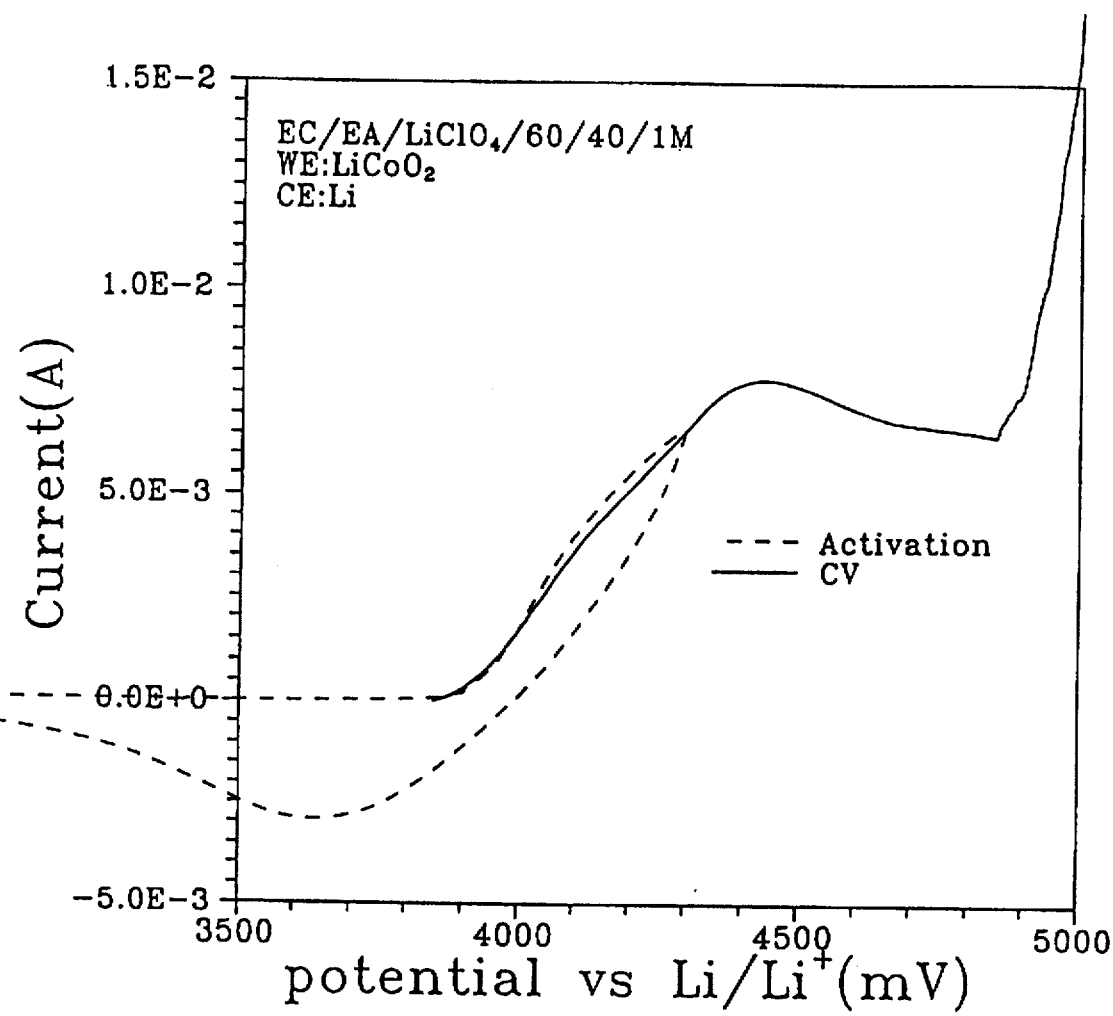
FIG. 5 is a plot of electric current as a function of potential (vs. Li/Li$^+$) measured from an electrolyte according to a second preferred embodiment of the present invention; the composition of the electrolyte is designated as EC/EA/LiClO$_4$/60/40/1M, working electrode: LiCoO$_2$, counter electrode: Li.

The test procedure in Example 4 was identical to Example 3 except that the organic solvent contained 60/40 by volume of ethylene carbonate (EC) and ethyl acetate (EA), and the electrolyte was designated as $EC/EA/LiClO_4/60/40/1M$. The test results are shown in FIG. 5. FIG. 5 shows a rapid rise in current at voltages above 4.85 V. This indicates that the stability of the $EC/EA/LiClO_4/60/40/1M$ electrolyte (4.85V) is slightly less than the $EC/EA/LiClO_4/1/1/1M$ electrolyte (4.9 V), but is still greater than 4.8 V.

EXAMPLE 5

Figure 6:
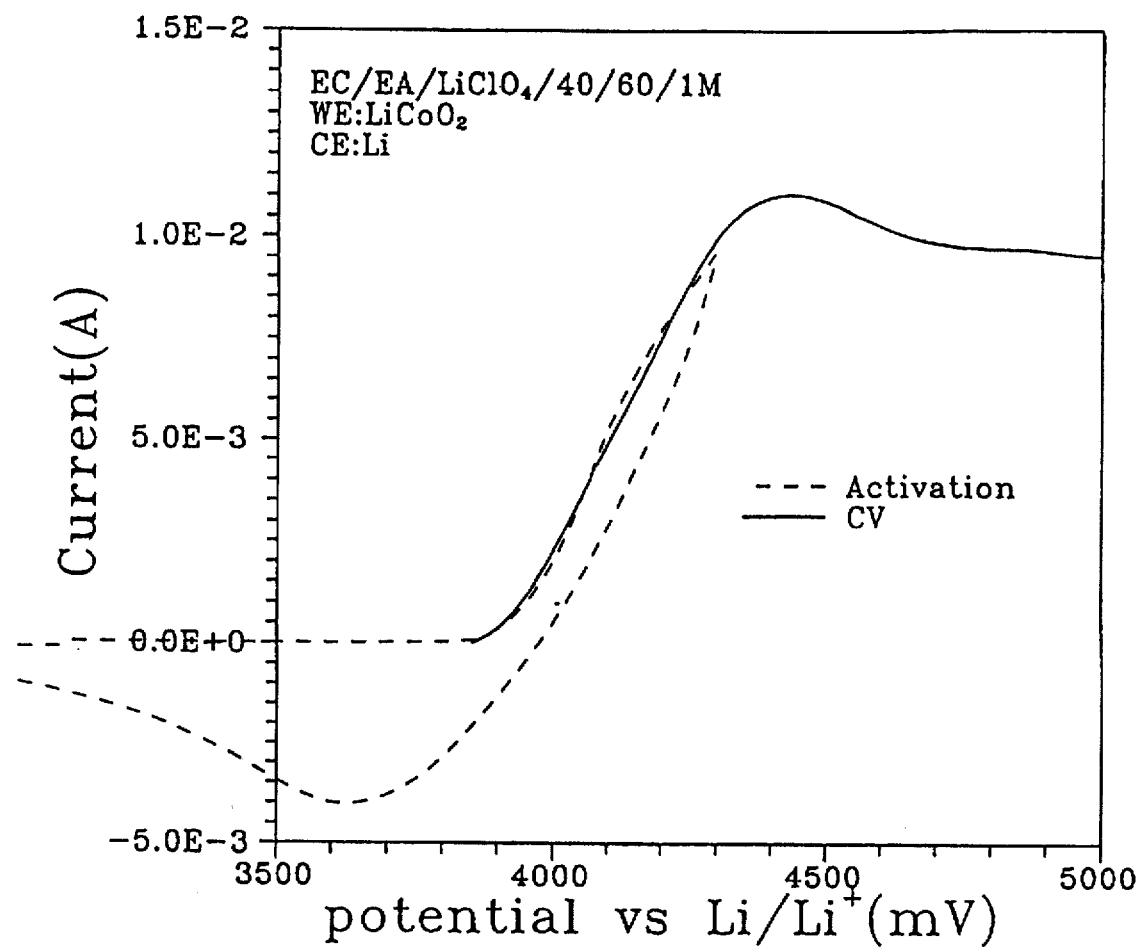
FIG. 6 is a plot of electric current as a function of potential (vs. Li/Li$^+$) measured from an electrolyte according to a third preferred embodiment of the present invention; the composition of the electrolyte is designated as EC/EA/LiClO$_4$/40/60/1M, working electrode: LiCoO$_2$, counter electrode: Li.

The test procedure in Example 5 was identical to Example 3 except that the organic solvent contained 40/60 by volume of ethylene carbonate (EC) and ethyl acetate (EA), and the electrolyte was designated as $EC/EA/LiClO_4/40/60/1M$. The test results are shown in FIG. 6. FIG. 6 shows that no decomposition was observed even at voltages above 5 V. This indicates that the stability of the $EC/EA/LiClO_4/40/60/1M$ electrolyte (above 5V) is better than both the $EC/EA/LiClO_4/1/1/1M$ electrolyte (4.9 V) and the $EC/EA/LiClO_4/60/40/1M$ electrolyte (above 4.85 V).

EXAMPLE 6

Figure 7:
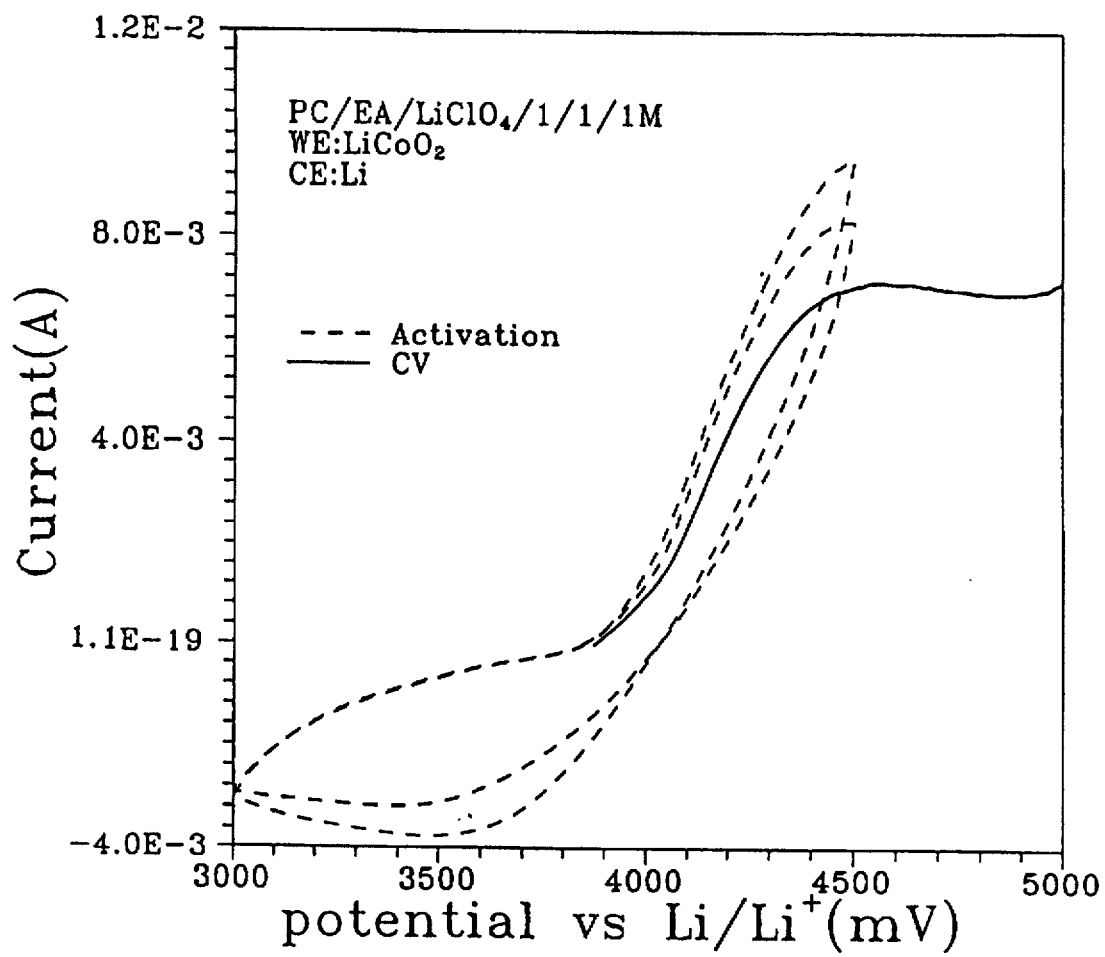
FIG. 7 is a plot of electric current as a function of potential (vs. Li/Li$^+$) measured from an electrolyte according to a fourth preferred embodiment of the present invention; the composition of the electrolyte is designated as PC/EA/LiClO$_4$/1/1/1M, working electrode: LiCoO$_2$, counter electrode: Li.

The test procedure in Example 6 was identical to Example 3 except that the organic solvent contained 1/1 by volume of propylene carbonate (PC) and ethyl acetate (EA), and the electrolyte was designated as $PC/EA/LiClO_4/1/1/1M$. The test results are shown in FIG. 7. FIG. 7 shows a rapid rise in the electric current at voltages above about 5 V. This indicates that the stability of the $PC/EA/LiClO_4/1/1/1M$ electrolyte is at about 5 V.

EXAMPLE 7

Figure 8:
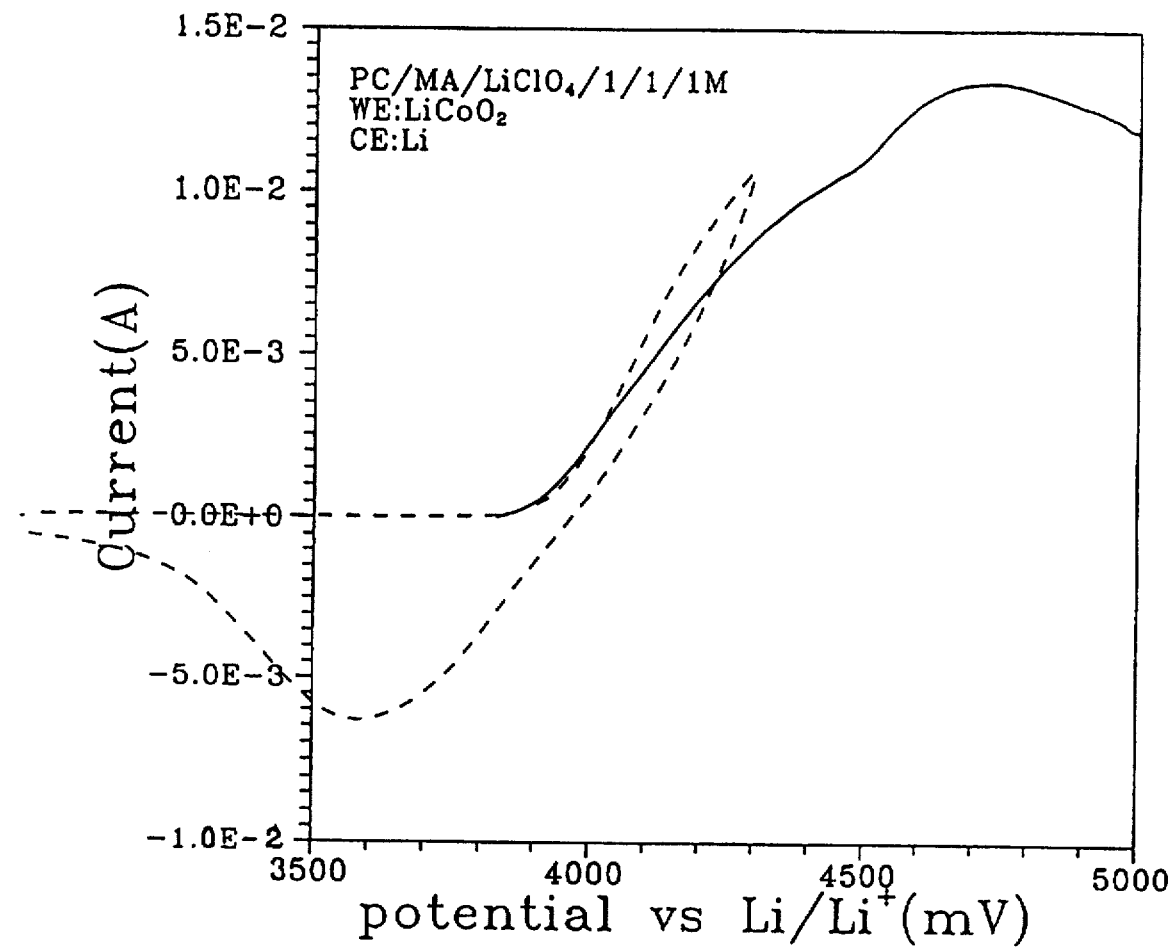
FIG. 8 is a plot of electric current as a function of potential (vs. Li/Li$^+$) measured from an electrolyte according to a fifth preferred embodiment of the present invention; the composition of the electrolyte is designated as PC/MA/LiClO$_4$/1/1/1M, working electrode: LiCoO$_2$, counter electrode: Li.

The test procedure in Example 7 was identical to Example 6 except that the organic solvent contained 1/1 by volume of propylene carbonate (PC) and methyl acetate (MA), and the electrolyte was designated as $PC/MA/LiClO_4/1/1/1M$. The test results are shown in FIG. 8. FIG. 8 shows that no decomposition was observed even at voltages above 5 V. This indicates that the stability of the $PC/MA/LiClO_4/1/1/1M$ electrolyte is above 5V.

EXAMPLE 8

Figure 9:
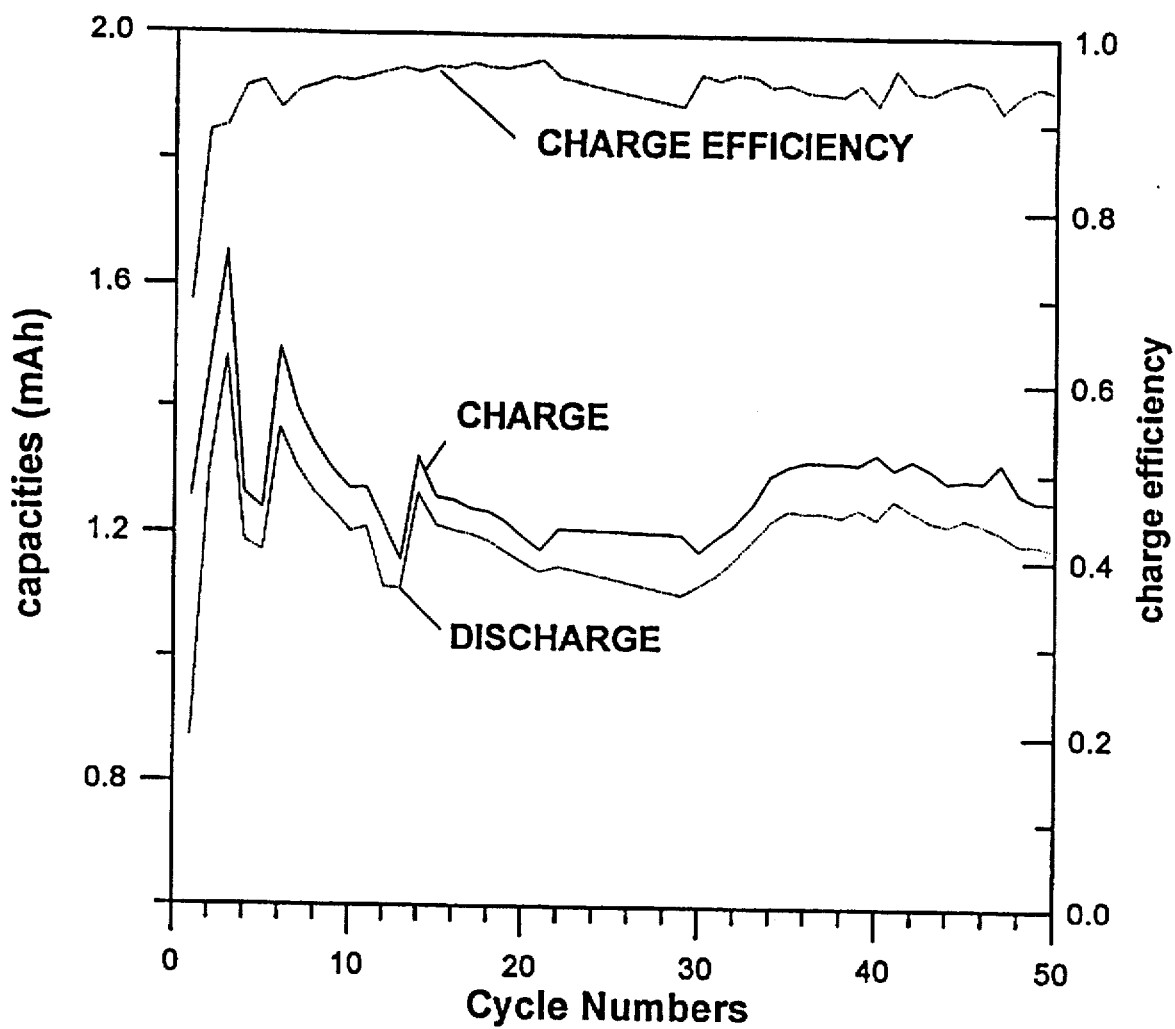
FIG. 9 is a plot of electric current as a function of potential (vs. Li/Li$^+$) measured from an electrolyte according to a sixth preferred embodiment of the present invention; the composition of the electrolyte is designated as EC/EA/LiPF$_6$/40/60/1M, working electrode: LiCoO$_2$, counter electrode: Li.

The test procedure in Example 8 was identical to Example 3 except that the electrolyte contained 1M $LiPF_6$ dissolved in an organic solvent, which contained 40/60 by volume of ethylene carbonate (EC) and ethyl acetate (EA), and the electrolyte was designated as $EC/EA/LiPF_6/40/60/1M$. The test results are shown in FIG. 9. FIG. 9 shows that no decomposition was observed even at voltages above 5 V. This indicates that the stability of the $EC/EA/LiPF_6/40/60/1M$ electrolyte is above 5V.

COMPARATIVE EXAMPLE 1

Figure 1:
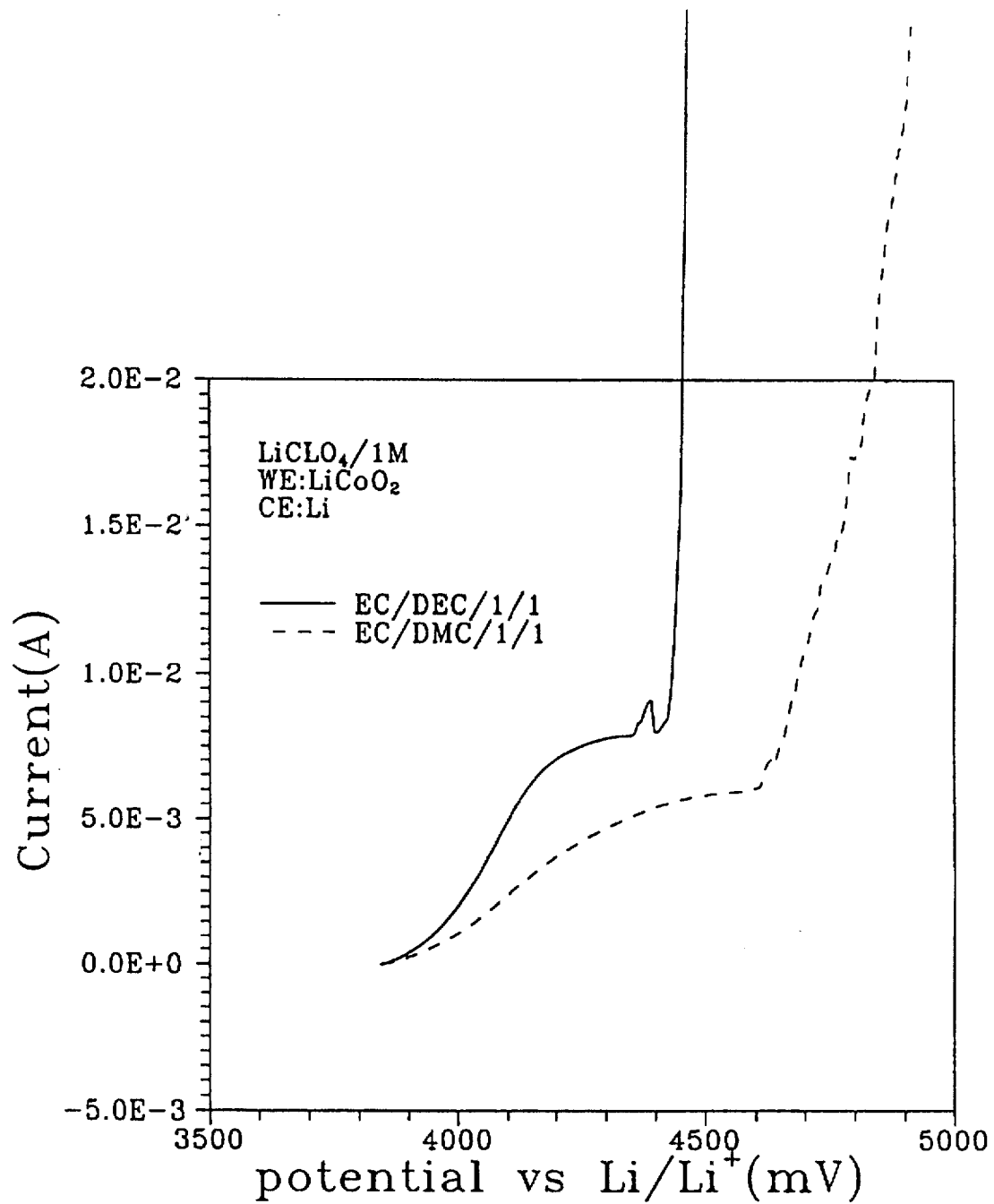
FIG. 1 is a plot of electric current as a function of potential (vs. Li/Li$^+$) measured from two prior art electrolytes that have been disclosed for use in a conventional lithium secondary battery.

The test procedure in Comparative Example 1 was identical to Example 3 except that the organic solvent contained 1/1 by volume of ethylene carbonate (EC) and diethyl carbonate (DEC), and the electrolyte was designated as $EC/DEC/LiClO_4/1/1/1M$. The test results are shown in FIG. 1. FIG. 1 shows a rapid rise in the electric current at voltages above about 4.6 V. This indicates that the stability of the $EC/DEC/LiClO_4/1/1/1M$ electrolyte is substantially inferior than those disclosed in the present invention.

COMPARATIVE EXAMPLE 2

The test procedure in Comparative Example 2 was identical to Example 3 except that the organic solvent contained 1/1 by volume of ethylene carbonate (EC) and dimethyl carbonate (DMC), and the electrolyte was designated as $EC/DMC/LiClO_4/1/1/1M$. The test results are shown in FIG. 1, which shows a rapid rise in the electric current at voltages above about 4.4 V. This indicates that the stability of the $EC/DMC/LiClO_4/1/1/1M$ electrolyte is also substantially inferior than those disclosed in the present invention.

EXAMPLE 9

Figure 10:
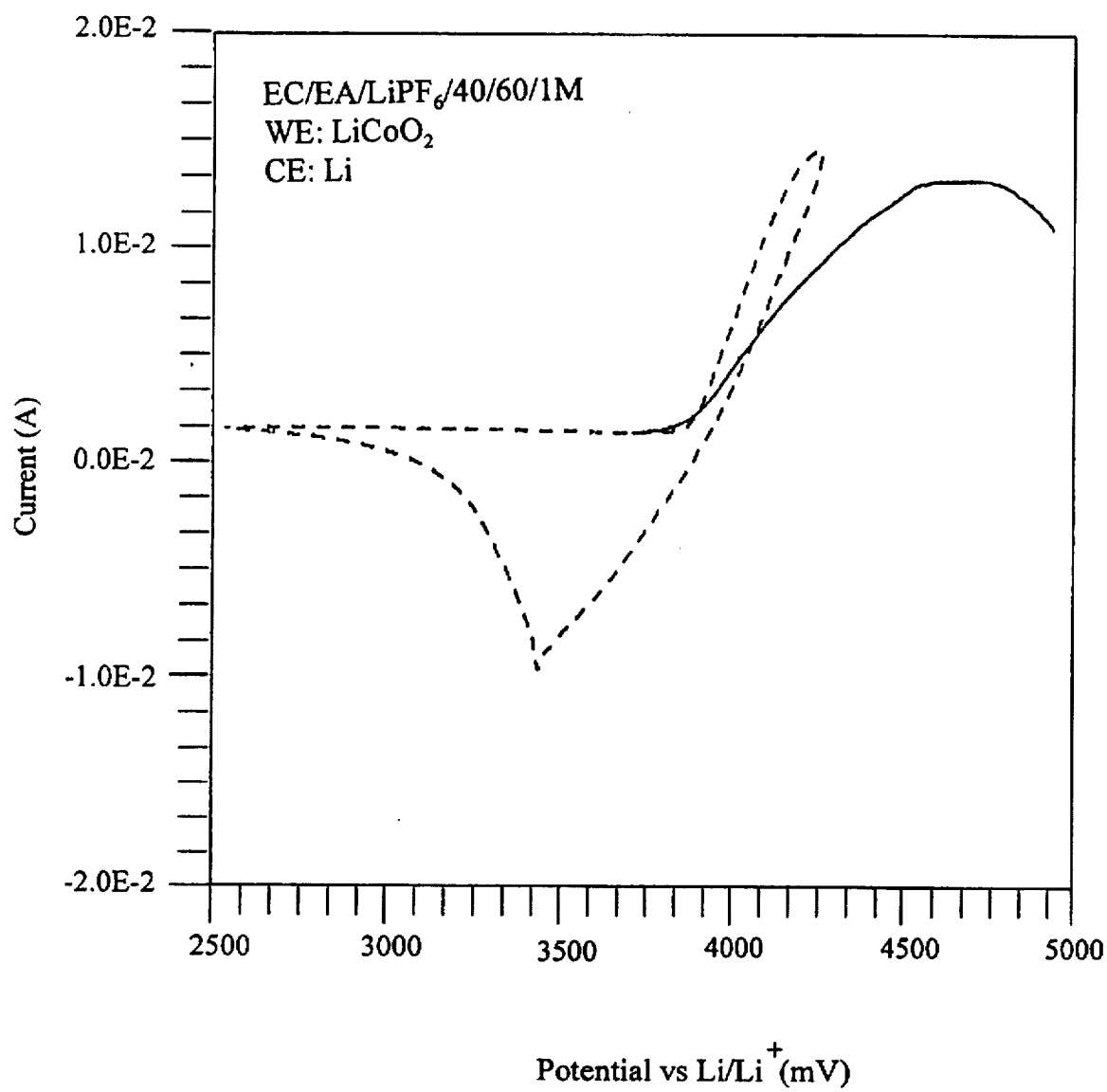
FIG. 10 shows plots of the capacities of a lithium secondary battery during charge/discharge, and the charge efficiency vs. cycle number, using an electrolyte of the present invention designated as EC/EA/LiClO$_4$/1/1/1M.

A rechargeable battery was prepared using a 1 $cm^2$ $LiCoO_2$ plate as cathode and a 1 $cm^2$ carbon plate as anode. The electrolyte solution was the $EC/EA/LiClO_4/1/1/1M$ electrolyte prepared in Example 1. FIG. 10 shows the charge/discharge curves (capacity vs. charge/recharge cycle) of the secondary lithium battery prepared. From FIG. 10, it can be derived that excellent charge efficiency (better than 90%) was obtained from the battery of the present invention, and that a relatively constant energy density of around 1.2 mAh was maintained over the cycles.

EXAMPLE 10

The present invention also discovered that while both PC/EA and EC/EA exhibited excellent high-voltage stability when coke was used as the cathode material (as shown in the above Examples), the service life of a PC/EA based battery was substantially reduced when graphite was used as the cathode material. The differences are summarized in Table 1 below. All the test conditions were similar to those described in Example 9.

TABLE 3

| Composition | Cathode material | Service Life |
|---|---|---|
| EC/EA/LiClO$_4$/1/1/1M | Coke | Good |
| EC/EA/LiClO$_4$/1/1/1M | Graphite | Good |
| PC/EA/LiClO$_4$/1/1/1M | Coke | Good |
| PC/EA/LiClO$_4$/1/1/1M | Graphite | Poor |

The purpose of Table 1 is to illustrate that electrolytic chemistry is a very delicate matter. Thus, while ethylene carbonate and propylene behave in a very similar way in many aspects, the totally different behavior when graphite was used as the cathode material, was totally unexpected. Thus, the electrolyte taught by Sugeno, which contained propylene carbonate in $R_1COOR_2$, wherein $R_1$ and $R_2$ can be from C1 to C4, would be a poor electrolyte when graphite was used as the cathode material. On comparison, Table I shows that the electrolyte of the present invention provided unexpectedly superior results.

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A lithium secondary battery comprising:
   (a) a coke-based cathode;
   (b) an organic electrolyte comprising:
      (i) a lithium salt; and
      (ii) an organic solvent mixture consisting essentially of a carbonate and an acetate; wherein said carbonate and said acetate are provided in a volume ratio of carbonate/acetate ranging from 80/20 to 20/80, and said lithium salt has a concentration of between 0.6 and 1.5M; wherein said carbonate is propylene carbonate.

2. The lithium secondary battery according to claim 1 wherein said acetate is selected from the group consisting of ethyl acetate and methyl acetate.

3. The lithium secondary battery according to claim 1 wherein said carbonate and said acetate are provided in a volume ratio of carbonate/acetate ranging from 40/60 to 60/40.

4. The lithium secondary battery according to claim 1 wherein said carbonate and said acetate are provided in a volume ratio of carbonate/acetate ranging from 40/60 to 50/50.

5. The lithium secondary battery according to claim 1 wherein said lithium salt is selected from the group consisting of LiClO$_4$, LiPF$_6$, LiBF$_4$, LiCF$_3$SO$_3$, and LiAsF$_6$.

6. The lithium secondary battery according to claim 1 wherein said lithium salt is selected from the group consisting of LiClO$_4$ and LiPF$_6$.

7. The lithium secondary battery according to claim 1 wherein said lithium salt is provided in a concentration of about 1M.

8. The lithium secondary battery according to claim 1 wherein:
   (a) said lithium salt is selected from the group consisting of LiClO$_4$, LiPF$_6$, LiBF$_4$, LiCF$_3$SO$_3$, and LiAsF$_6$; and
   (b) said acetate is selected from the group consisting of ethyl acetate and methyl acetate.

9. The lithium secondary battery according to claim 8 wherein said carbonate and said acetate are provided in a ratio of carbonate/acetate ranging from 40/60 to 60/40.

10. The lithium secondary battery according to claim 8 wherein said carbonate and said acetate are provided in a ratio of carbonate/acetate ranging from 40/60 to 50/50.

11. The lithium secondary battery according to claim 9 wherein said lithium salt is selected from the group consisting of LiClO$_4$ and LiPF$_6$.

* * * * *